Figure 23:
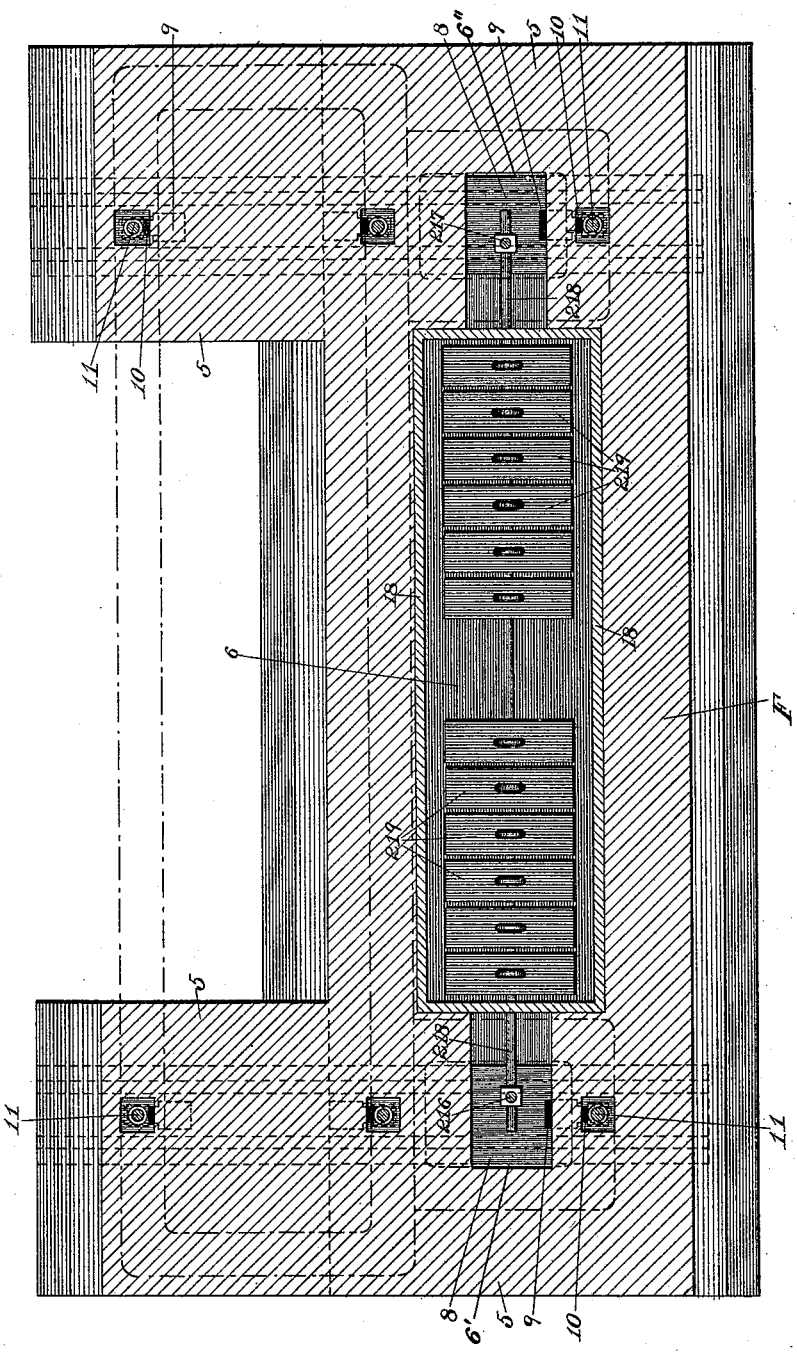

(No Model.)  10 Sheets—Sheet 1.
F. H. RICHARDS.
MULTIPLE DRILLING MACHINE.
No. 452,053. Patented May 12, 1891.
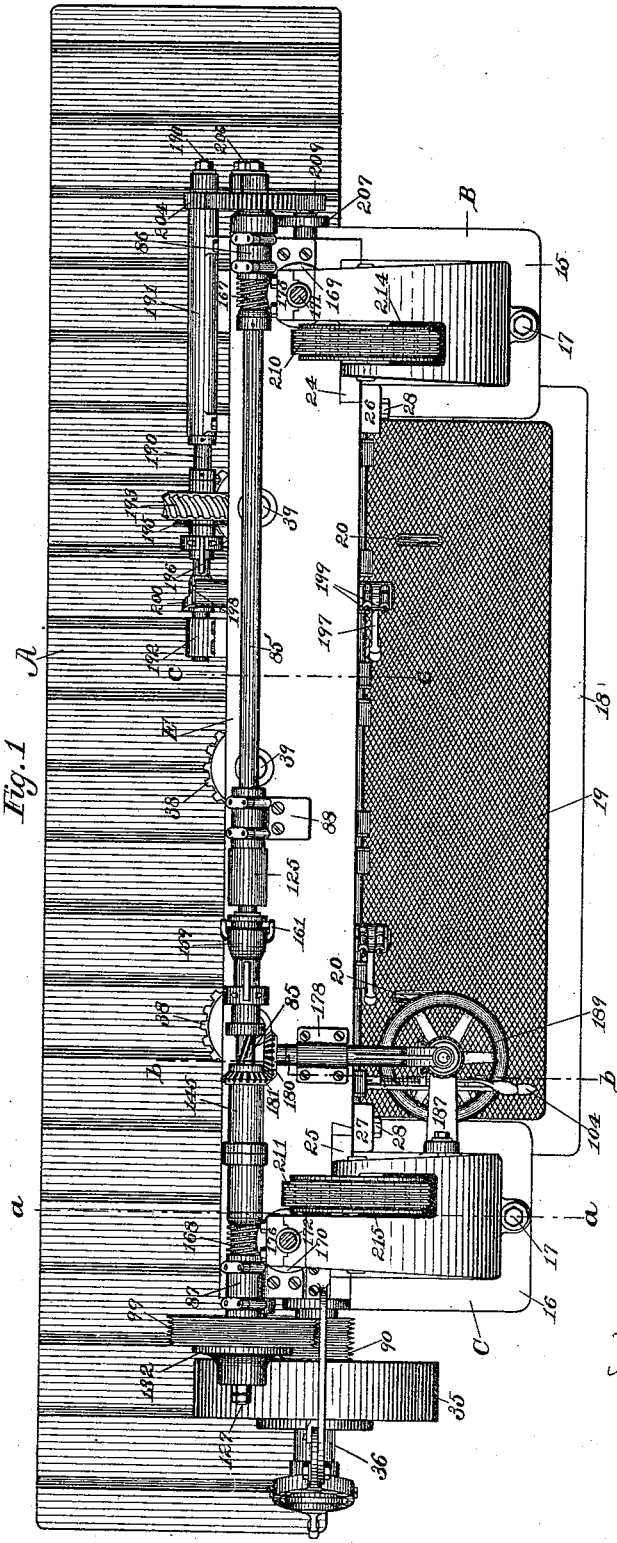
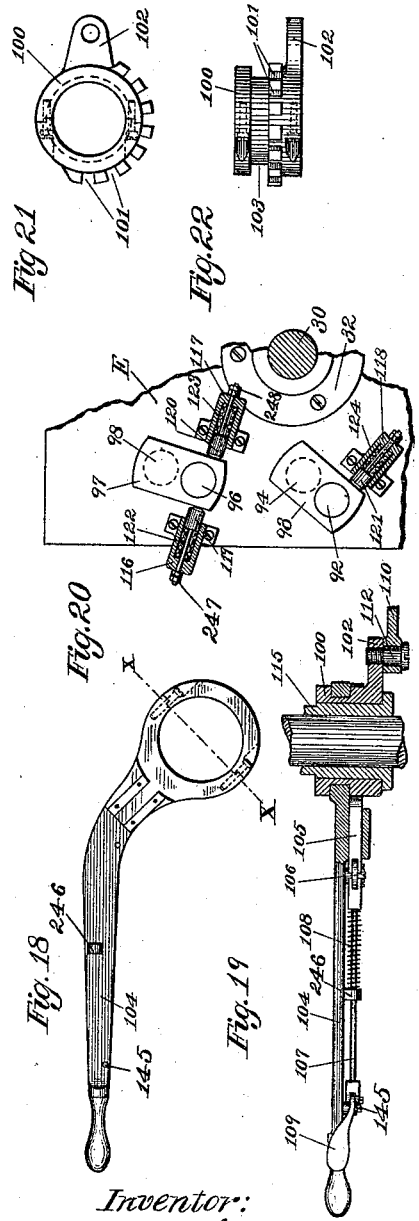
Inventor:
Francis H. Richards
Witnesses:
Henry L. Reckard
WM Bjorkman

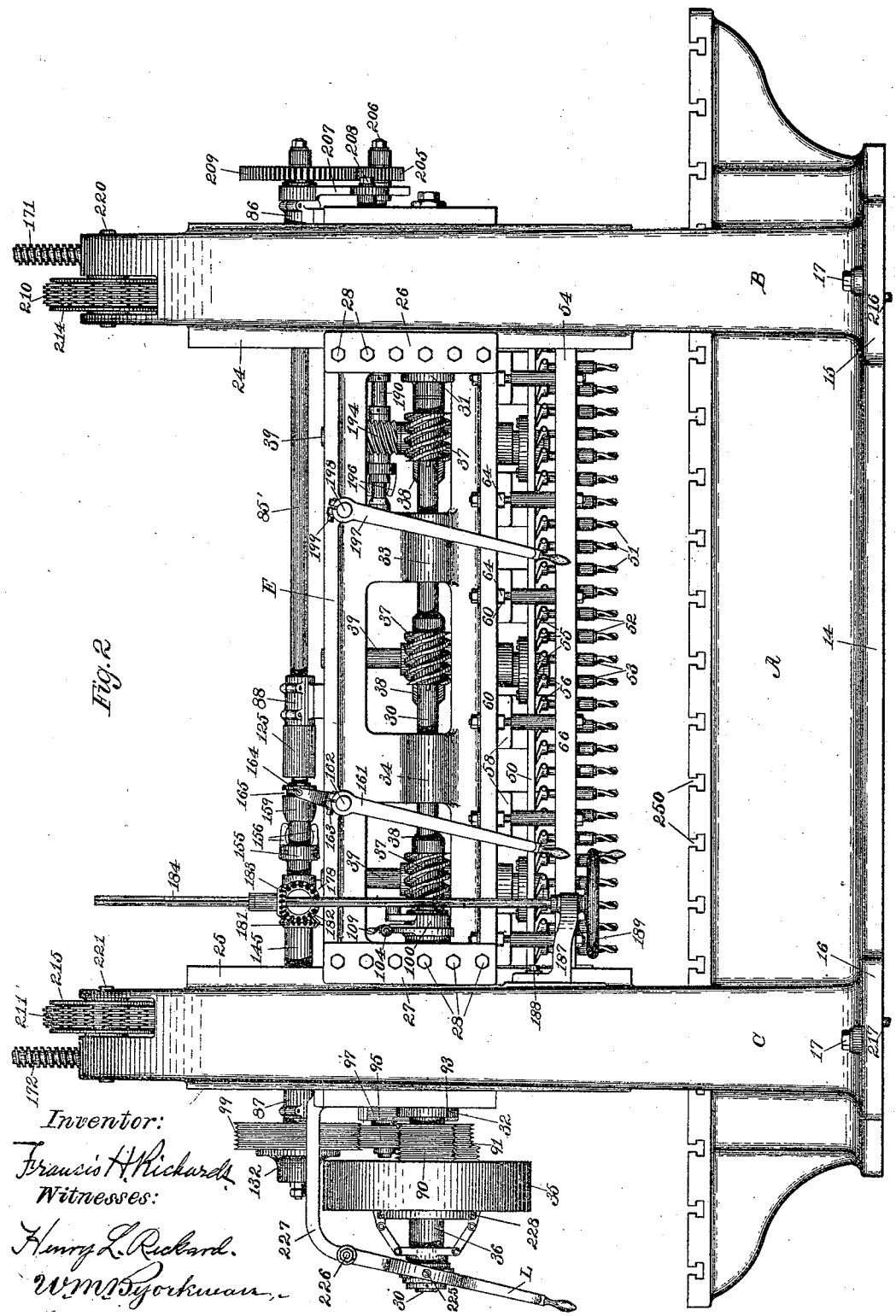

(No Model.) 10 Sheets—Sheet 3.
F. H. RICHARDS.
MULTIPLE DRILLING MACHINE.
No. 452,053. Patented May 12, 1891.
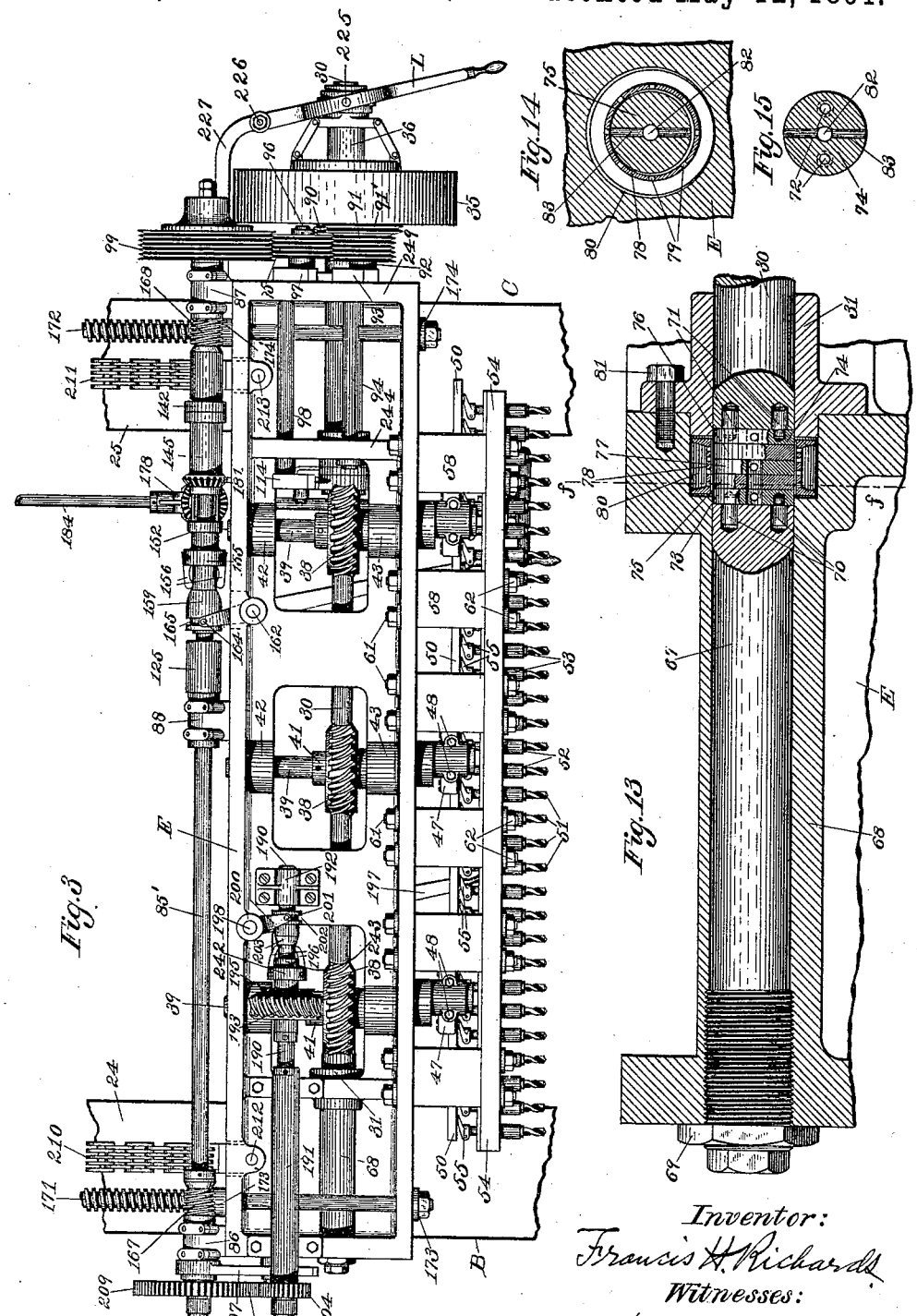
*Inventor:*
Francis H. Richards
*Witnesses:*
Henry L. Reckard
W. M. Bjorkman

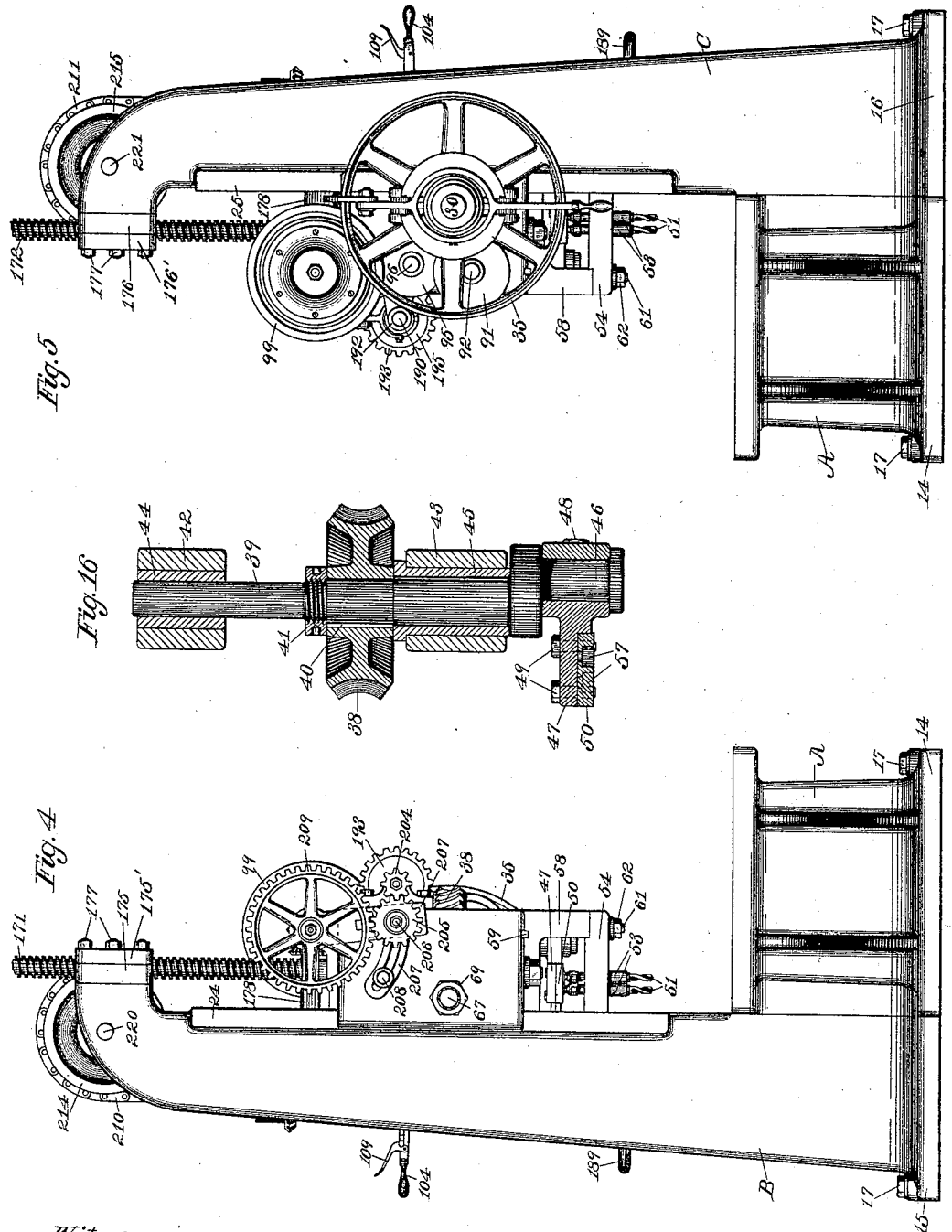

(No Model.)  10 Sheets—Sheet 5.
F. H. RICHARDS.
MULTIPLE DRILLING MACHINE.
No. 452,053. Patented May 12, 1891.
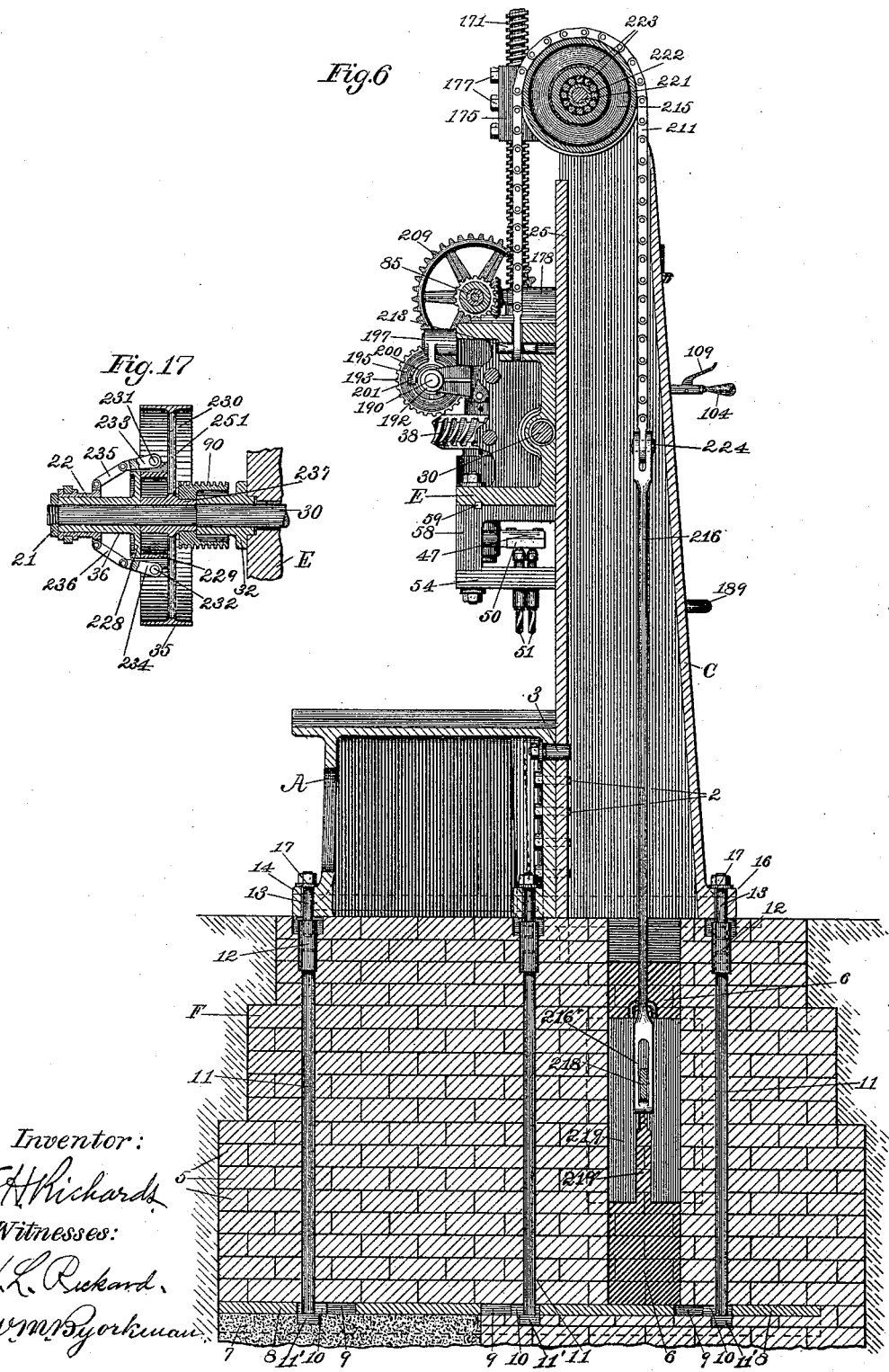
Inventor:
F. H. Richards
Witnesses:
H. L. Reckard
W. M. Bjorkman (No Model.) 10 Sheets—Sheet 6.
F. H. RICHARDS.
MULTIPLE DRILLING MACHINE.
No. 452,053. Patented May 12, 1891.
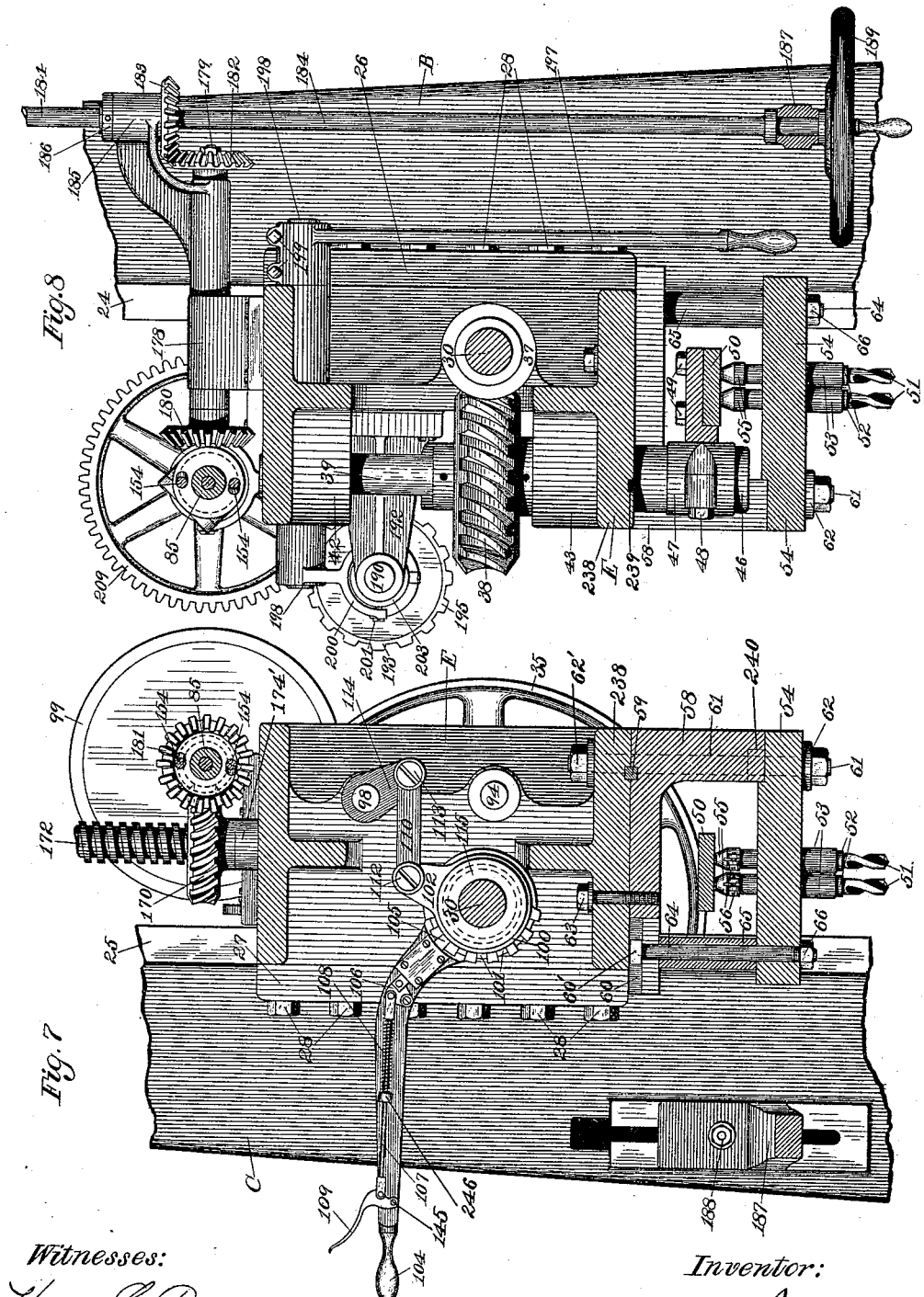
Witnesses:
Henry L. Rickard.
W. M. Bjorkman.
Inventor:
Francis H. Richards (No Model.)
F. H. RICHARDS.
MULTIPLE DRILLING MACHINE.
No. 452,053. Patented May 12, 1891.
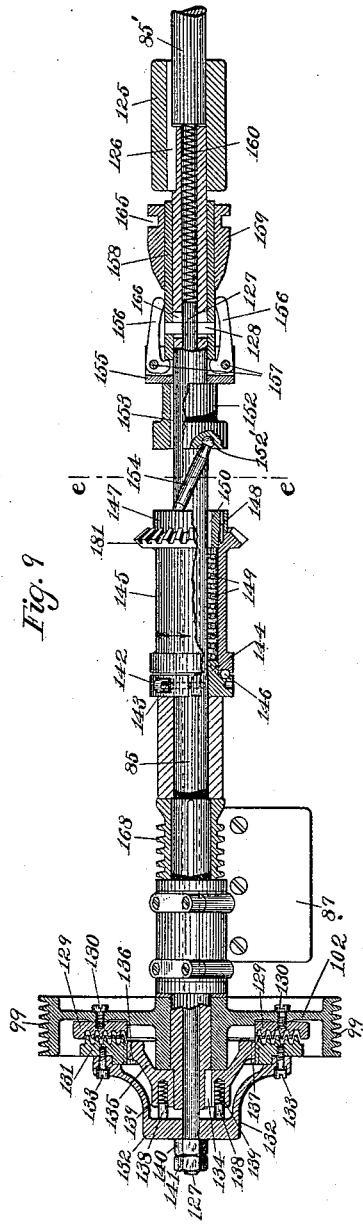
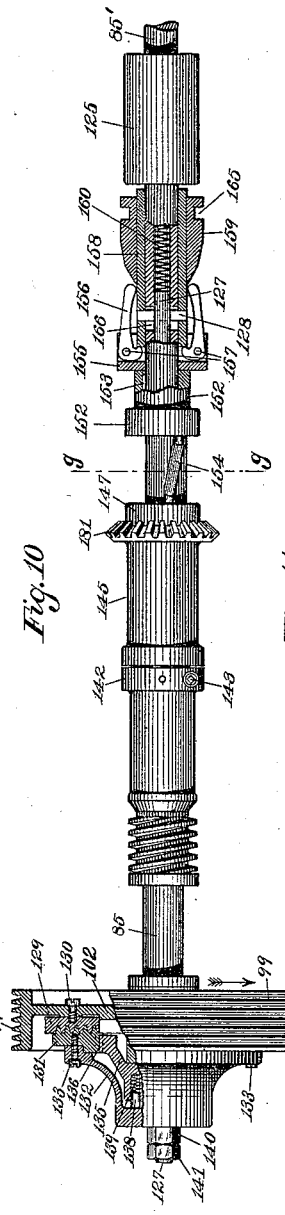
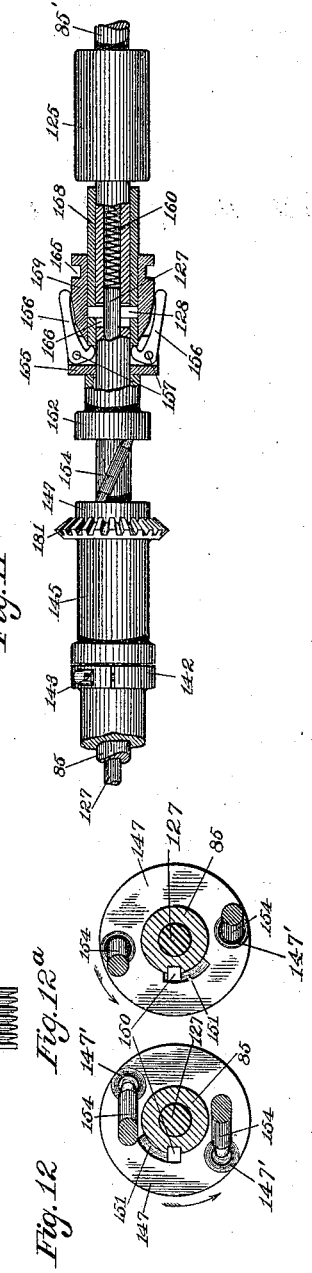
Witnesses:
Henry L. Reckard
W. M. Byorkman
Inventor:
Francis H. Richards (No Model.)   F. H. RICHARDS.   10 Sheets—Sheet 8.
MULTIPLE DRILLING MACHINE.

No. 452,053.   Patented May 12, 1891.

Witnesses:   Inventor:
Henry L. Rickard.   Francis H. Richards.
W. M. Bjorkman.

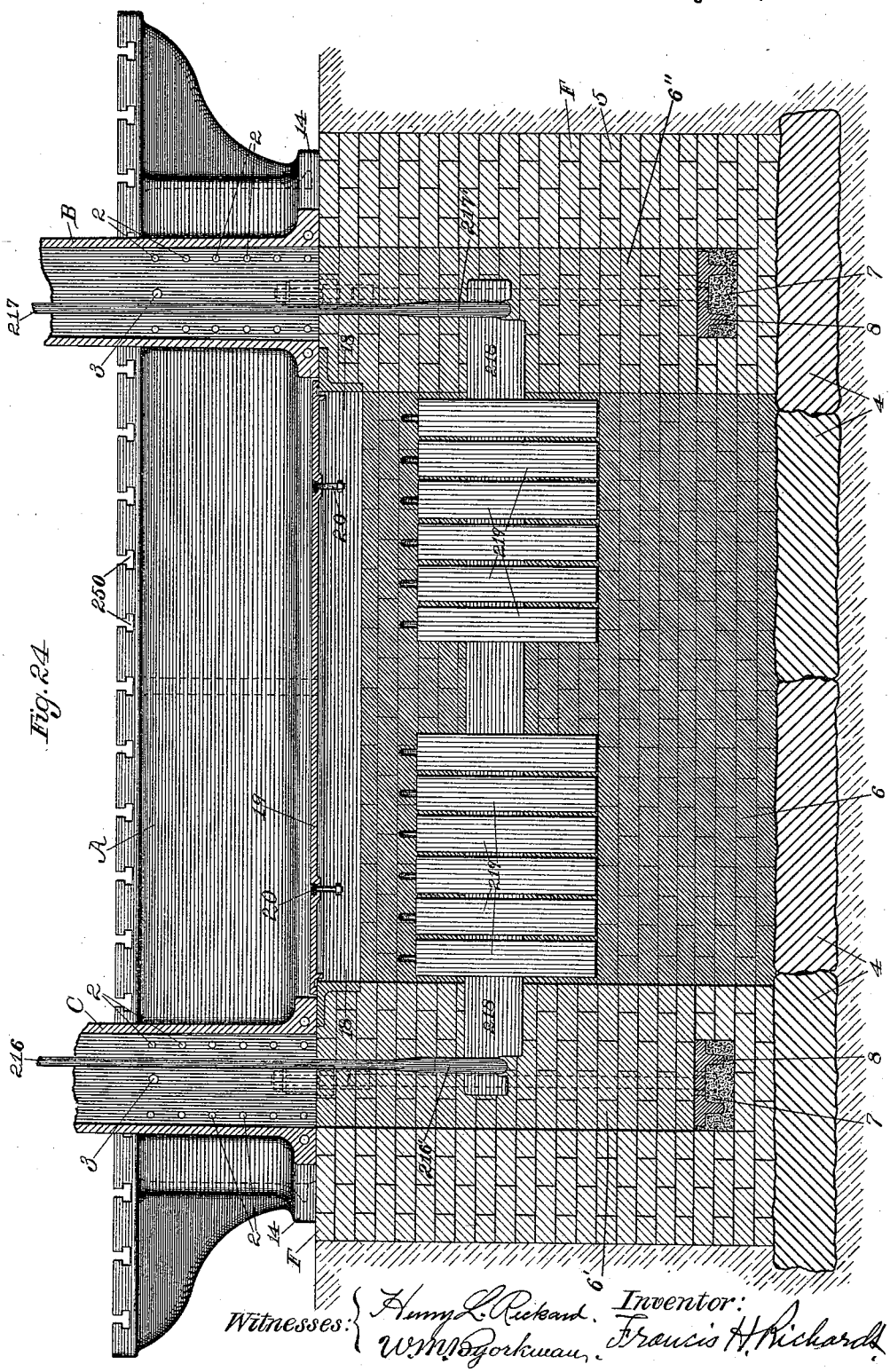

(No Model.) 10 Sheets—Sheet 10.
F. H. RICHARDS.
MULTIPLE DRILLING MACHINE.
No. 452,053. Patented May 12, 1891.
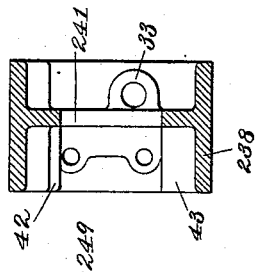
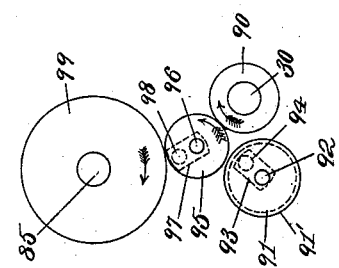
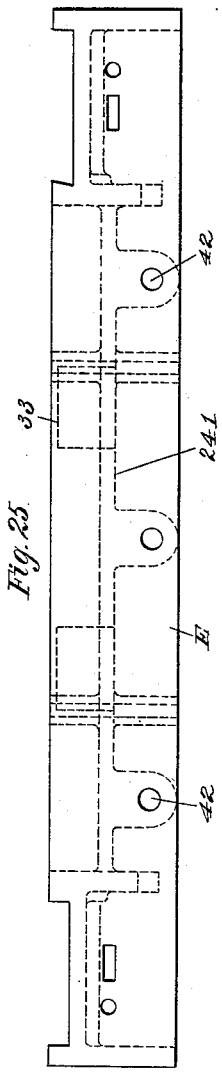
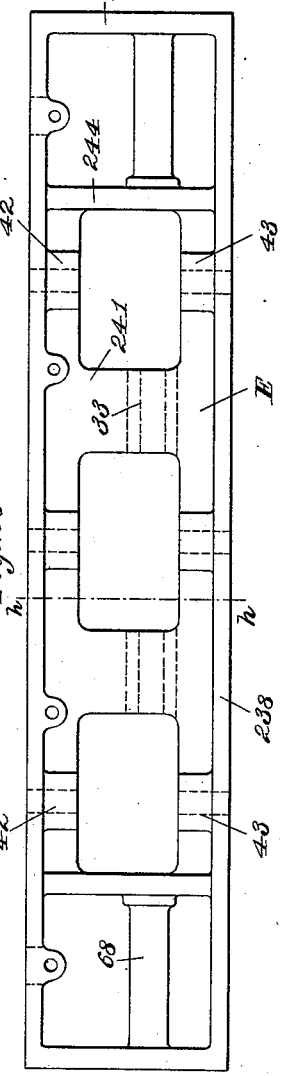
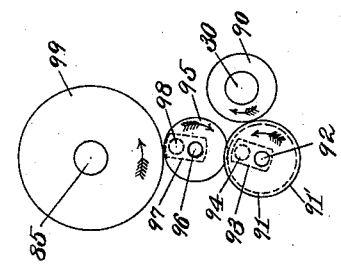
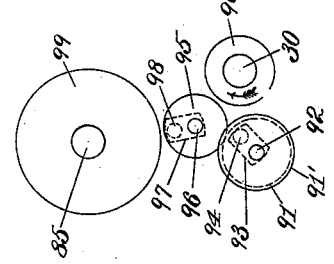
Witnesses:
Henry L. Reckard.
Emma G. Fowler.
Inventor:
Francis H. Richards
THE NORRIS PETERS CO., PHOTO-LITHO., WASHINGTON, D. C.

UNITED STATES PATENT OFFICE.

FRANCIS H. RICHARDS, OF HARTFORD, CONNECTICUT, ASSIGNOR TO ECKLEY B. COXE, OF DRIFTON, PENNSYLVANIA.

MULTIPLE DRILLING-MACHINE.

SPECIFICATION forming part of Letters Patent No. 452,053, dated May 12, 1891.

Application filed February 10, 1891. Serial No. 380,989. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Multiple Drilling-Machines, of which the following is a specification.

This invention relates to multiple drilling-machines of the class in which the crank-provided drill-spindles are actuated by a gyratory driver-plate.

In the drawings accompanying and forming a part of this specification, Figure 1 is a plan view of a drilling-machine embodying my improvements. Fig. 2 is a front elevation of the machine. Fig. 3 is a rear elevation of the vertically-movable beam carrying the drills and the feed mechanism. Fig. 4 is a side elevation as seen from the right hand of Fig. 2. Fig. 5 is a side elevation as seen from the left hand of Fig. 2. Fig. 6 is a vertical section taken on the line $a\ a$ of Fig. 1 and shows the parts at the right-hand side of said line in said figure. Fig. 7 is a vertical section of certain parts of the machine, taken on line the $b\ b$, Fig. 1, and looking toward the left hand. Fig. 8 is a vertical section taken on the line $b\ b$, Fig. 1, and looking toward the right hand. Fig. 9 is a plan view, partially in section, of the feed-shaft and accessory devices carried on the movable beam E, and shown in rear elevation in Fig. 3. Fig. 10 is a view similar to Fig. 9 and drawn in projection therewith, showing the same parts in a different position. Fig. 11 is a view similar to that part of Figs. 9 and 10 drawn in projection therewith, showing certain of the details in another position. Fig. 12 is a view in the line $e\ e$, Fig. 9, showing certain details at the left hand of said line in one of their relative positions. Fig. 12$^a$ is a view similar to Fig. 12 on the line $g\ g$, Fig. 10, showing said parts in another relative position. Fig. 13 is a longitudinal sectional view, partially in section, of the step-bearing for taking the thrust of the principal driving-shaft. Fig. 14 is a cross-sectional view in the line $f\ f$, Fig. 13. Fig. 15 is a cross-sectional view through the wearing-plate 74, which is also shown in Fig. 13. Fig. 16 is an enlarged sectional view showing the construction and mode of supporting one of the crank-shafts, with certain details accessory thereto. Fig. 17 is a central vertical section of the main driving-pulley and clutch. Figs. 18, 19, 20, 21, and 22 are views showing in detail the construction and arrangement and illustrative of the mode of operation of the feed-shifting lever and accessory details. Fig. 23 is a plan view of the foundation of the machine. Fig. 24 is a vertical longitudinal section of the foundation and shows the main bed of the machine in position thereon. Fig. 25 is a plan view of the movable beam E divested of all the details carried thereby. Fig. 26 is a rear elevation of the beam as shown in Fig. 25. Fig. 27 is a cross-sectional view of the beam in line $h\ h$, Fig. 26, showing that portion of the beam at the left hand of said line $h\ h$. Figs. 28, 29, and 30 are diagrammatic views illustrating the mode of operation of the frictional reversing-gearing.

Similar characters designate like parts in all the figures.

The drilling-machine shown in the drawings is of relatively large size, the scale of the drawings being approximately one-sixteenth of full size.

The machine is more especially designed for drilling heavy boiler-plate, the drills being shown arranged in a "zigzag" row.

The frame-work of this machine consists of the bed or base A, the right-hand column B, and the left-hand column C, both secured to the bed by means of suitable bolts, as 2, and the dowel-pins, as 3. (See Figs. 6 and 24.) The frame-work, being massive, should be set on the ground-floor of the mill or factory building upon a masonry foundation, of which a suitable construction is illustrated in the drawings, Figs. 6, 23, and 24. The bottom or floor of the foundation may consist of flat or stones, as 4, Fig. 24, on which floor the walls brick-work foundation (designated in a general way by F) is built, the brick-work being built in layers 5 in a well-known manner. In the interior of the foundation is an elongated pit 6 for receiving the large counter-weight for balancing the aforesaid movable beam of the drilling-machine. At the ends thereof said pit is or may be narrowed, as indicated in the plan view in Fig. 23, said narrowed portions 6' and 6'' being located under and in communication with the interior of the aforesaid columns C and B, respectively. As a means for bolting the frame-work to the foundation, suitable anchor-bars, as 8, are embedded at 7, Figs. 6 and 24, in the foundation crosswise thereto, as indicated by dotted lines in Fig. 23, and as also shown in Figs. 6 and 24. On these anchor-bars the greater part of the weight of the frame-work rests, the spaces between the ribs of the bars and underneath the same being filled in the usual manner with concrete. As shown in the drawings, said bars are perforated with holes 9, having slots 10 extending from one side thereof, being thus constructed for receiving the heads 11' of the anchor-bolts 11, which bolts are embedded in the foundation when this is constructed. The anchor-bolts 11 extend nearly to the top of the foundation, where they are provided with nuts or thimbles 12, whose upper ends extend close to the top of the foundation and are threaded to receive the studs or short bolts 13, which pass up through holes in the flanges 14, 15, and 16 of the bed and columns, respectively, and are provided at their upper ends with the usual nuts 17. The bolts 11 being in practice somewhat larger in diameter than the bolts 13, if either bolt should give way it would of course be the smaller one, which, being close to the top of the foundation, is therefore accessible and easily repaired.

Around the top of the pit there is a frame 18, of angular section, substantially as shown in Figs. 23 and 24, forming a cope for the inner edge of the foundation-walls and a seat for the pit-cover or foot-board 19. (Shown in Figs. 1 and 24.) For raising and removing the foot-board for gaining access to the counter-weights in the pit said foot-board is furnished with suitable handles, as 20, loosely passed through holes and resting in recesses therein in a well-known manner, so as to drop flush with the foot-board when the handles are not in use, as will be understood by those acquainted with such matters from comparison of Figs. 1 and 24.

Owing to the considerable weight of the parts to be counterbalanced, it is found desirable to use a composite counter-weight, so that the same may be more readily handled. The counter-weight is carried by two suspension-rods 216 and 217, which are connected, as hereinafter set forth, with the movable beam, and are located in the columns C and B, respectively. The lower ends of said rods are formed into loops 216' and 217', respectively, for carrying the hook-shaped ends of the counterweight-beam 218, as will be understood by comparison of Figs. 6, 23, and 24. On said counterweight-beam are placed a series of weights 219, each furnished at its upper end with an eye, whereby the same, by means of a suitable lifting-hook, may be lowered into or raised from the pit. Said weights, as best shown in Fig. 6, are slotted at 219', so as to set over said beam 218 and rest properly thereon. Each of said weights 219 is supposed to be limited to the weight of one or two hundred pounds, so that the same may be readily lifted out by one or two laborers whenever occasion requires.

For the purpose of receiving the aforesaid movable beam E, carrying the operative parts of the machine, the columns B and C are provided with vertical ways 24 and 25 on the inner sides of said columns, respectively, as indicated in Figs. 1 and 2, said ways being even with the rear faces of the columns and set parallel to each other. The cross-beam E is set against the rear faces of the columns, and is gibbed to said ways by means of the straps 26 and 27, respectively, said straps being secured to the beam by the bolts 28 in a well-known manner. The beam, together with the machinery carried thereon, is supported by means of the counterbalance-chains 210 and 211, which are secured to the beam, as indicated in Figs. 3 and 6, by means of the pins 212 and 213, respectively. Said lifting-chains pass upward and over the pulleys 214 and 215, respectively, and thence down to the upper ends of the aforesaid counterbalance-rods 216 and 217, respectively, being connected to said rods by suitable pins, as 224, Fig. 6. Said chain-wheels 214 and 215 are carried, substantially as shown, in openings in the rearwardly-curved upper ends of the hollow columns B and C, respectively, being supported on shafts or journals 220 and 221, respectively. Said wheels may be carried directly on their said shafts, or may have, as shown in Fig. 6, anti-friction rollers 223 for reducing the friction on the shafts, in view of the great weight carried thereby. As shown in Fig. 6, there is a thimble 222 intermediate to the shaft 221 and the rollers 223; but the use of said thimble is not essential, its purpose being to permit the removal of the chain-wheel with the anti-friction rollers held in place by means of the thimble, thereby preventing said rollers falling out of place on removal of the shaft preparatory to removing the wheel.

In practice it is thought desirable to counterweight the beam E sufficienty to normally lift the same, so that to lower said beam requires the application of a positive force downward thereto. For this purpose the beam E (shown in detail in Figs. 25 to 27, inclusive) is provided with two feed-screws 171 and 172, situated at the right-hand and left-hand ends, respectively, of the beam. Said screws are journaled in bearings formed in the beam, as will be understood from the rear view, Fig. 3, being furnished at their lower ends with the collars 173 and 174, respectively, and also provided with fixed collars 173' and 174', respectively bearing against the upper side of the beam, as also shown in said Fig. 3 and in Fig. 7. Immediately above said fixed collars 173' and 174' said feed-screws are provided with worm-wheels 169 and 170, respectively, whereby said screws may be revolved for the purpose of lowering and lifting the beam, as hereinafter more fully set forth. The feed-screws 171 and 172 extend upward from the beam E and engage with the feed-nuts 175 and 176, carried on the upper ends of the columns B and C, respectively. Said feed-nuts may, if desired, be formed integral with said columns, respectively; but it is deemed preferable to construct the nuts separately from said columns and removably secured thereto. As indicated in Figs. 4 and 5, respectively, said feed-nuts may be formed in two parts 175 and 175' and 176 and 176', said parts being held to their respective columns by bolts, as 177, in a well-known manner. The principal object of the described construction and arrangement of the feed-nuts is to facilitate the construction thereof, and especially the assembling and disassembling of the machine.

The operative machinery carried on the beam E comprises the principal driving mechanism for actuating the drills and feed mechanism for actuating the aforesaid feed-screws to raise and lower the beam on the columns. The main driving-shaft 30 is journaled in the bearings 32 and 31 at the ends thereof, and also in the intermediate bearings 33 and 34, as indicated in Fig. 2. The bearing 32 is secured by screws (not shown) to the left-hand end of the beam E, as indicated in Figs. 2 and 17, the bearing 31 being a step-bearing similarly fixed to the beam, as more fully shown in Figs. 3 and 13. The thrust of said main shaft 30 being toward the step-bearing, this bearing is provided with the step-screw 67, screwed into the part 68 of the beam, as indicated in Fig. 13, and is furnished with a check-nut 69 for setting the same in place. The point of said step-screw is furnished with a wearing plate or washer 73, which may be held in place by dowel-pins, as 70. A similar wearing-plate 74, similarly held in place by dowel-pins 71, is shown fixed to the end of the shaft 30. Intermediate to said plates 73 and 74 are a series of wearing-plates 75, 76, and 77, which in practice are supposed to be made of different materials—as, for instance, hardened steel and hard Babbitt metal or phosphor-bronze, alternating with each other. Thus in the arrangement shown the plates 73, 74, and 77 should be of hardened steel or of chilled iron or like material, while the intermediate plates 75 and 76 would be of the bronze or other like material suitable in character for running on the steel or chilled-iron surfaces under heavy pressure without abrasion. As a means for thoroughly lubricating the several wearing plates or washers, the space longitudinally intermediate to the shaft 30 and the step 67 is enlarged to form the chamber 80 concentric to the axes of said shaft and stud. In this chamber and nearly filling the diameter thereof is a ring 78, slightly shorter than said chamber 80 and of an internal diameter slightly larger than said wearing-plates 73 to 77, inclusive. This ring is shown in cross-section in Fig. 14, and is perforated with numerous openings, as 79, for facilitating the lubrication. A similar section of one of the wearing-plates 75 is shown in said Fig. 14 within the ring 78, while a like section of another wearing-plate 74 is shown in Fig. 15. All of said wearing-plates are preferably centrally perforated, as at 82, Figs. 14 and 15, and also have diametrical perforations, as 83, extending from said central perforations to the periphery thereof. The purpose of these several perforations is to permit free passage of the oil to the interior of the wearing-plates, from which, by natural centrifugal action, it is carried out between the plates for the lubricating thereof. The internal diameter of the ring 78 being slightly larger, as described, than said wearing-plates, the wearing-plates are not thereby held strictly in alignment with the shaft 30, but are allowed to have a slight gyratory action, whereby the surfaces are caused to slip on each other, so as to prevent the same wearing in grooves, and thus secure greater durability and more perfect lubrication. The thrust of the shaft 30 being transmitted through several plates, as set forth, before it is finally received by the step-screw 67, and said plates being thoroughly lubricated, as set forth, causes the wear and friction to be distributed between the several pairs of bearing-surfaces, so that the velocity of movement of the plates on each other is reduced to a fraction of the velocity of the shaft, thus very greatly reducing the tendency to heat and distributing the wear over a larger area of metal moving at a relatively slow speed. The chamber 80, in that part thereof below the lower side of the shaft 30 forms an oil-pocket for retaining the lubricating-fluid, while the ring 78 constitutes a bucket-wheel, which, by means of the aforesaid openings and the flanges thereof, carries the oil to the upper side of the shaft and wearing-plates, there to descend into the openings of said plates. In practice, the aforesaid bearing 31 is let in, as indicated in Fig. 13, into the chamber 80 a short distance, being held in place by a suitable number of bolts, as 81, in a well-known manner.

For revolving the main shaft 30, said shaft, outside of the bearing 32, carries loosely fitted thereon the driving-pulley 35, and outside of said pulley clutch mechanism for engaging and disengaging the pulley from the shaft. The clutch mechanism may be of any well-known description, and that shown in the drawings is of a well-known kind. The sleeve 36 is fixed by means of a key (not shown) and the nut 21 to the outer end of the shaft 30, and the clutch-collar 22 is fitted to slide on said sleeve 36, as will be understood from Figs. 1, 2, 3, and 17. The clutch-collar is operated by means of the hand-lever L, which is pivotally connected at 225 to the ring 22, carried on said sliding sleeve. The upper end of said hand-lever L is pivoted at 226 to the outer end of an outreaching arm 227, whose inner end is attached in any suitable manner to the top of the beam E, as indicated, for instance, in Figs. 1 and 2. Said outreaching arm 227 and pivot 226 thus furnish the fulcrum whereby to opperate said sliding sleeve 22 through said hand-lever. On the inner end of the sleeve 36 is a disk 228, carrying the shoes or sectional friction-ring of the clutch, the inner and continuous friction-ring 229 being fixed to the arms 230 of the wheel 35, as indicated in Fig. 17. For opening and closing the usual divided clutch-ring 251, said ring is provided with actuating-screws 231 and 232, Fig. 17, and these screws with arms 233 and 234, respectively, which arms are actuated by the links 235 and 236 from the aforesaid sliding sleeve. In the drawings the sliding sleeve 22 is shown in its outermost position, the clutch being then opened to allow the driving-pulley 35 to run freely on the shaft 30. When it is required to start said shaft revolving, it is only necessary to seize the hand-lever L and force the sliding collar 22 toward the driving-pulley, thus throwing apart the said arms 233 and 234, and thereby closing the outer clutch-ring onto the friction-rim 229 of the driving-pulley.

The inner end of the hub 237 of the driving-pulley 35 carries fixed thereon a frictional gear 90, which is the first one of a train of friction-wheels for actuating the feed-gearing to raise and lower the beam by a quick movement. Said frictional gearing is more particularly described and claimed in my application, Serial No. 375,152, filed December 18, 1890. The driving-shaft 30 carries, secured thereto by keys in the usual manner, a series of worms 37, (in this instance three in number,) which mesh with and drive the corresponding worm-wheels 38, that are carried on the three similar crank-shafts 39, being fixed thereto by the keys 40 and the nuts 41. The construction of said crank-shafts, which is best shown in Fig. 16, will be understood from a description of one of them. The shaft 39 is journaled at its upper end in bearing 42 and at its lower end in the lower bearing 43, which bearings both form a part of the cross-beam E, and are usually furnished with the bushings 44 and 45, respectively.

The crank 46 of the shaft 39 carries a crank-box 47, which is formed in two parts clamped together by the bolts 48. The crank-boxes 47 are secured to the gyratory driving-bar 50 by the holding-bolts 49. Said bar operates the drills 51, which are carried by drill-spindles 52, that are fitted to turn freely in spindle-sockets 53, screwed into the drill-carrying jig-plate or bar 54. The drill-cranks 55 are firmly fixed to the upper ends of the drill-spindles 52 by means of the clamp-screws 56, Fig. 7, the crank-pins being fitted into the holes 57, Fig. 16, formed in said gyratory bar 50.

The particular construction and mode of operation of the drill-spindles are described in Letters Patent No. 404,364 granted to me May 28, 1889, to which reference may be had. Fig. 6 of the drawings in the said patent well illustrates the preferred construction of the parts referred to. In my present application the drills 51 correspond to the "drills 40" in the said patent, the spindles 52 to "spindles 22," the sockets 53 to "sockets 24," cranks 55 to "cranks 30," and clamp-screws 56 to "clamp-screws 35." From the above comparison it will be seen that the above-enumerated parts are or may be alike, and that further description thereof is unnecessary in this application.

The jig-plate is carried by a series of brackets 58, whose construction and arrangement are well shown by Figs. 3 to 8, inclusive. The lower plate 238 of the beam E has a keyway 239 longitudinal thereof, (see Fig. 8,) and corresponding keyways are formed in the brackets, whereby said brackets are keyed in place by means of the keys 59, (see Fig. 7,) which keys lie partly in each of said keyways, as indicated in the drawings. At their forward ends said brackets have the T-shaped slots 60 for receiving the heads 60' of the bolts 64, which hold up the forward edge of said jig-plate 54, said bolts passing through thimbles 65, substantially as shown. The rearward edge of said jig-plate is bolted to the depending lower ends of the bracket 58, as will be understood by Fig. 7, the lower bolt 61 passing through the lower flange 238 of the beam E, through said bracket, and through the jig-plate, said bolt being provided at its lower end with the nut 62 and at its upper end with the nut 62', substantially as shown. The forward ends of the brackets, which are at the left hand in Fig. 7 and at the right hand in Fig. 8, are secured to the said lower plate 238 of the beam E by means of bolts 63, which pass through said lower flange and screw into the bracket, as will be understood from Fig. 7. Whenever it is required to remove the jig-plate for any purpose, it is only necessary to remove the nuts 62 and 66, when said plate may be let down and taken away, either for purposes of repair or substitution therefor of another jig-plate having a differently-arranged set of drills. In the latter case it is necessary also to change the driver-plate 50, whose crank-pin bearings 57 must, of course, correspond in number and arrangement with the drill-sockets 53. For this purpose it is only necessary to unscrew the bolts 49, thus freeing the driver-plate from the crank-boxes 47.

The aforesaid bolts 61 have or may have a collar formed integral therewith, as shown in dotted lines at 240, Fig. 7, which collar is let into a counterbore in the lower end of the bracket 58, so that the upper nut 62' serves to rigidly hold the bracket in place independently of the lower nut 62. Said lower nut is thus effective only for the purpose of holding the jig-plate 54 to said bracket. By means of this arrangement removal of the jig-plate does not loosen the attachment of the bracket to the beam.

For raising and lowering the beam E and the drilling machinery carried thereon the feed-screws 171 and 172, hereinbefore described, are connected for simultaneous rotation by means of a feed-shaft 85, carried in suitable bearings on the beam, and having two similar worms 167 and 168, which mesh with and drive the worm-wheels 169 and 170 on said feed-screws, respectively. The bearings for carrying said feed-shaft 85, as shown in the drawings, are three in number and are designated by 86, 87, and 88, respectively, said bearings being furnished with caps in the usual manner and secured to the beam by screws, as will be understood by comparison of the several views in which said bearings are shown. By turning the feed-shaft 85 the worm-gearing described rotates the feed-screws to raise or lower the beam, as the case may be. For operating said feed-shaft two independent systems of feed mechanism are employed, of which one is especially adapted for slowly feeding down the beam to its work, while the other (shown at the left hand in Figs. 1 and 2 and at the right hand in Fig. 3) is designed to both lower and raise the beam by a quicker movement, so as to save time in handling the machine.

The construction of the feed mechanism for slowly lowering the beam will be understood by comparison of Figs. 1, 2, 3, 4, 5, 6, and 8, and comprises an intermediate feed-shaft connected with the feed-shaft 85 through a train of change-wheels and gearing actuating said intermediate shaft from the drill-actuating mechanism through a suitable clutch. The intermediate shaft 190 is carried in the long bearing 191, which is secured to the rear side of the beam E, as indicated in Figs. 1 and 3, and at its inner end by the bearing 192, which is shown attached by screws to the web 241 of said beam. Said shaft 190 carries loosely mounted thereon the worm-wheel 193, which meshes with the worm 194, that is fixed to one of the crank-shafts 39, as will be understood from Figs. 2 and 3. The wheel 193 is of the kind commonly known as a "friction-wheel," being fitted to engage the sliding friction-disk 195, which is splined to said shaft 190, all in a well-known manner. Said friction-disk is operated by clutch-levers 196, pivotally supported in the sliding collar 242 and taking their bearing against the fulcrum-ring 243, fixed on the shaft 190, said levers being actuated by the sliding clutch 203, with whose groove 202 the pins 201 of the arm 200 engage. Said arm 200 is fixed to the rear end of the shaft 198, which shaft is journaled in a bearing formed in the beam E, and is provided at its front end with the hand-lever 197, said lever having clamp-screws 199 for setting the same on the forward end of said shaft 198. By this means the operator, seizing the hand-lever 197, may force clutch 203 between the levers 196 or may withdraw the clutch therefrom, thus frictionally engaging or disengaging the friction-wheel 193 from the shaft 190. These details, it will be observed, are not materially dissimilar from the ordinary friction counter-shaft in common use, and hence the brief description here given will suffice for a proper understanding thereof. At its outer end said intermediate shaft 190 carries the change-wheel 204, which meshes with the intermediate wheel 205, which is carried on the stud 206 and meshes with the change-wheel 209, that is fixed on the outer end of the aforesaid feed-shaft 85. The stud 206, carrying said intermediate wheel 205, is adjustably secured in a slot in the radius-bar 207, which bar is fitted to swing on the shaft 85 or on the bearing 86 thereof, and is held in place by the clamp-screw 208. This system of change-wheels and accessory details is or may be substantially the same as commonly used on engine-lathes and like machine-tools for changing the rate of feed by substitution of different sizes of wheels.

The feed mechanism for raising or lowering the beam by quick movement comprises the aforesaid feed-shaft 85 and the system of frictional gearing organized for operating said shaft in either direction by power under hand control. This system of feed mechanism, as shown in the drawings, comprises a train of frictional reversing-gearing described and claimed in my said application, Serial No. 375,152, filed December 18, 1890, and the system of hand-controlled power-feed mechanism described in my application, Serial No. 376,672, filed January 3, 1891.

The train of frictional gearing comprises the aforesaid frictional driving-wheel 90, carried by the driving-pulley 35, the driven wheel 99, carried on the feed-shaft 85, and a pair of intermediate friction-wheels 91 and 95, intermediate to said driving and driven wheels. The wheel 95 is the principal intermediate wheel, since it is brought into use in driving the feed-shaft in one or the other direction, while the wheel 91 is only used as a reversing-wheel. Said wheel 95 is carried on the stud or crank 96 of the rock-shaft 98, said crank being connected with said shaft by the crank-arm 97, as will be understood by comparison of Figs. 3 and 20. On the inner end of said shaft 98 this shaft is provided with a rocker-arm 114, carrying a stud 113, which is connected by the link 110 to a stud 112, fixed in the arm 102 of the ratchet-sleeve 100, which ratchet-sleeve is fitted to turn on the bushing 115, that is supported in the cross-bar 244 of the beam E. Said ratchet-sleeve 100 is shown formed in two parts, (see Figs. 21 and 22,) held together by screws in a well-known manner to facilitate assembling of the machine. Said ratchet-sleeve has a series of notches 101 and a groove or bearing 103, whereon is fitted the hub of the hand-lever 104, which is provided with a sliding bolt 105, constructed for engaging and disengaging said notches. Said lever 104 is divided on the line $x\ x$, Fig. 18, the two parts thereof being held together by screws in a well-known manner, as indicated by dotted lines in said figure, for the purpose of facilitating the assembling and disassembling of said parts. As a means for operating the aforesaid sliding bolt or latch 105, said lever is provided with the thumb-piece 109, pivoted thereto at 245 and connected for actuating said bolt through the rod 107 and the intermediate lever 106, a spring 108, reacting against the abutment 246 on said lever 104, being provided for throwing the latch 105 into engagement with said notches. (See and compare Figs. 7, 18, 19, 21, and 22.) The particular purpose of the ratchet device here described is to permit the normal working position of the handle 104 to be raised or lowered accordingly as the beam stands high up or low down on the main columns B and C. When the beam is raised, the handle, if set in the position shown in Fig. 7, would be out of convenient reach, in which case the workman, by means of the latch described, could disconnect the handle and set the same in a lower position. The crank-arm 97, and of course all the parts rigidly connected thereto, are normally held in an intermediate position, wherein the wheel 95 is free of both the driven and driving pulleys by means of oppositely-disposed spring-detents. (Shown in Fig. 20.) Said detents consist of the brackets 116 and 117, set in position, substantially as shown, and bored to receive the spring-actuated plungers 119 and 120, respectively, which plungers are actuated by the springs 122 and 123, respectively, and are limited in their forward movement by nuts 247 and 248 on the outer ends of the plunger-stems. When the crank 96 is thrown toward the shaft 30, the plunger 120 is forced back, but the opposite plunger 119 does not follow. Consequently the spring 123 is active to replace the crank whenever the operator releases the lever 104. In like manner when the operator, through said lever, forces the crank 96 away from the shaft 30 the plunger 119 is forced back, while the plunger 120 remains as shown. By means of this arrangement the crank is normally held in an intermediate position, and is automatically replaced therein whenever it is moved in either direction, and then released. The two spring-actuated plungers are required for operating the crank-arm 97 because of the two modes of using the principal intermediate wheel 95. The second intermediate wheel 91 is similarly supported upon a crank 92, carried by the crank-arm 93 of the rock-shaft 94, which shaft is journaled in bearings formed in the said cross-bar 244 and the end wall 249 of the beam E, as will be understood by comparison of Figs. 3, 5, 7, and 20. Said crank-arm 93 is shown in its neutral position in Figs. 20 and 28 resting on the spring-actuated plunger 121, which is carried, together with its actuating-spring 124, in the bracket 118, which is fixed by screws to said end wall of the beam E. The operation of the intermediate wheels 95 and 91 is illustrated in Figs. 28, 29, and 30, and also is fully described in my aforesaid application. When it is required to drive the wheel 99 through one intermediate only, the workman seizes the lever 104 and raises the same, thereby throwing the crank 96 toward the shaft 30 and bringing the wheel 95 into engagement with both the wheels 90 and 99, as illustrated in Fig. 30. When it is required to drive said wheel 99 through two intermediates, so as to reverse the direction of its rotation, the workman, seizing said lever 104, bears down on the same, thereby throwing the crank 96 away from the shaft 30 and bringing the wheel 95 into engagement with and between the two wheels 99 and 91, and at the same time forcing the wheel 91 into engagement with the wheel 90. In this case the wheel 90 frictionally engages the larger end 91' of the wheel 91, while the smaller end thereof engages said intermediate wheel 95, as illustrated in Fig. 29. The result is that all of the train of wheels are brought into operation and the power is communicated through two intermediates, thus reversing the motion as compared with that obtained by the use of only one intermediate, after a well-known principle. In either case, on releasing the aforesaid hand-lever the aforesaid spring-actuated plungers return the cranks to their neutral positions. (Shown in Figs. 20 and 28.)

The hand-controlled feed mechanism comprises the details carried on the shaft 85 between the bearings 87 and 88, together with a hand-wheel and means operatively connecting the hand-wheel with said mechanism. As a matter of convenience, the shaft 85 is constructed in two parts or sections, the part 85' being solid, while the part 85 is tubular, the two parts being connected at the left hand of the bearing 88 by the shaft-coupling 125. As before mentioned, the feed-shaft 85 carries worms 167 and 168, meshing with the worm-wheels 169 and 170 for actuating the feed-screws 171 and 172, respectively.

The above-described driving-pulley 99, carried on the shaft 85 outside of the bearing 87, is fitted to freely revolve on said shaft 85, being furnished with clutch mechanism for engaging and disengaging the driving-wheel from the shaft. For this purpose a friction-ring-supporting disk 135 is fixed on the shaft by a key, as 134, and engages on its outer periphery within the sliding friction-ring 131, the engagement of said disk and friction-ring being effected by means of keys 136 and 137, fitted into one of said parts and sliding in keyways in the other of said parts. The friction-ring 131 corresponds to and engages with a similar friction-ring 129, which is secured to the web 102 of the wheel 99 by means of screws 130, or in some other suitable manner. The sliding friction-ring 131 is actuated for engaging and disengaging the ring 129 by means of the friction-ring disk 132, to the outer edge of which said ring is secured by screws 133.

The disengagement of the friction-ring 131 from the ring 129 is effected by means of springs 139 and plugs 138, which are carried in the hub of the disk 135 and bear against the hub or central portion of the friction-ring carrier 132, as will be understood from the sectional portion of Fig. 9. The engagement of said friction-rings is effected by the shipper-rod 127, which is carried within the hollow feed-shaft 85, and has at the left-hand end thereof the adjusting-nuts 140 and 141, said rod being actuated by clutch-rod-actuating devices for imparting suitable longitudinal movements thereto within said hollow feed-shaft.

For actuating the shipper-rod to engage the described friction-rings or friction-clutch two apparatuses are employed—one for effecting the firm or "permanent" engagement thereof and the other for controlling said engagement by hand. The first of said apparatuses is shown in sectional view at the right hand of Figs. 1 and 2 and at the left hand in Fig. 3, and in detail in Figs. 9 to 12$^a$, inclusive. For the purposes of this rod-shifting apparatus the collar 152 may be considered as fixed on the shaft 85, being splined thereto by the key or spline 153 and prevented by suitable means from longitudinal movement. The sliding sleeve 158, carried on the shaft 85, is connected with the rod 127 by means of a key 128, working in the slot 166, formed in said shaft 85. A spring 160, carried in the bore of said shaft at the right hand of the rod 127 and reacting against the solid shaft 85', serves to throw the said rod toward the left hand between the normally-fixed collar 152 and the sliding sleeve 158. There is firmly mounted on the shaft 85 a carrier 155, in which is pivoted at the points 157 the pair of clutch dogs or levers 156 156, whose shorter arms engage the left-hand end of the sleeve 158 and whose longer arms extend toward the right hand over said sleeve. The conical sleeve or "wedge" 159 is fitted to slide freely on the sleeve 158, and has a circumferential groove 165 for receiving the pins, as 164, of a suitable wedge-actuating lever 161, which lever is pivoted at some suitable point, as 162, on the beam E and has a handle for operating the same. In Fig. 9 said wedge is shown in its idle position on the right-hand end of the sleeve 158, the friction-rings 129 and 131 being disengaged.

In Fig. 11 the wedge is shown driven toward the left hand between the longer arms of the dogs or levers 156, the sleeve 158 being forced toward the right hand by the shorter arms of said dogs, as will be understood by comparison of Figs. 9 and 11. This, acting through the key 128 and the rod 127, draws the carrier 132, together with the ring 131 thereon, toward the right hand and brings said ring 131 into engagement with the driving friction-ring 129.

As shown in Fig. 9, the friction-rings stand apart, the wedge 159 is at the right hand, and the clutch dogs or levers 156 stand with their long arms bearing against the outside of the sleeve 158, while the short arms of said levers bear, as is shown, against the end of said sleeve. If now said collar 152, instead of being fixed on the shaft 85, should by any means be forced toward the right hand, it is obvious said collar would then act, through the carrier 155, the levers 156, the sleeve 158, and key 128, to draw the rod 127 toward the right hand, and thus bring the friction-rings into engagement, as shown in Fig. 10. It will also be evident that if said sliding movement of the collar 152 be suitably effected by hand-power the clutch will thereby come under hand control and will be actuated independently of the above-described clutch-actuating apparatus. For actuating the sliding collar, as aforesaid, and thus operating the clutch, I employ devices wherein the connection between the hand-wheel and said collar is made through a part whose motion is a resultant of two motions, one being communicated from a hand-wheel and the other from the driven mechanism. Said devices in their preferred form (shown in the drawings) consist of the sleeve 145, having thereon the gear 181, which meshes with the pinion 180, fixed on a shaft 179, that is carried by the bearing 178, and is actuated through the gears 182 and 183 from the shaft 184 and hand-wheel 189 for operating said sleeve by hand. The sleeve 145 reacts against the collar 142, and in practice a series of anti-friction rollers or balls, as 146, may be placed in suitably-formed grooves, substantially as indicated in Fig. 9, for lessening the frictional resistance at that point. The collar 142 is or may be clamped to the shaft 85 by the clamp-screws 143, by which means and by the aid of a pin or lever engaging suitable holes in the periphery of the said collar said collar may be turned on the shaft and set thereon in any required position in a well-known manner. The collar 142 should enter a short distance, as indicated in Fig. 9, within the sleeve 145, thus furnishing a bearing for said sleeve, which at its right-hand end is carried by the revoluble collar 147. The torsion-spring 149, carried (preferably, as shown) within the sleeve 145, engages at one end the collar 142 and at the other end the collar 147, the torsional tension of said spring being regulated by adjusting the collar 142 on the shaft 85.

A limited rotary movement of the sleeve 145 (including, of course, the gear 181 and the collar 147) on the shaft 85 is provided for by making a notch or keyway 151 in the collar 147, Figs. 12 and 12$^a$, that is fixed to said sleeve and gear by suitable means—as, for instance, the pin 148—or may be formed integral therewith, the movement being limited by a key 150, fixed in the feed-shaft. (See Figs. 12 and 12$^a$.) In the face or right-hand end of the collar 147 are sockets, as 147', and in the face or left-hand end of the aforesaid sliding collar 152 are corresponding sockets, as 152', Fig. 9. Thrust rods or braces 154 154 are set between said collars 147 and 152, being seated at opposite ends in the said sockets, respectively. The construction and organization of the apparatus are such that when the collar 147 stands relatively to the key 150, as shown in Figs. 9 and 12, the thrust-rods 154 stand considerably oblique to the feed-shaft, as indicated in said figures; but the movement on the feed-shaft of said collar 147 is such that on turning forward the collar by hand (the shaft 85 not revolving) said thrust-rods 154 are carried to the position shown in Figs. 10 and 12ᵃ nearly parallel with the feed-shaft, thereby forcing the collar 152 toward the right hand and through the connections hereinbefore described engaging the friction-ring 131 with the friction-ring 129 on the driving-pulley. The collar 147 is normally held in engagement against the key 150, as shown in Figs. 9 and 12, by the spring 149, said spring being under suitable tension therefor. On turning forward the collar 147 to the position indicated in Figs. 10 and 12ᵃ the adjustment of the parts is such that the friction-rings become firmly engaged before or as soon as the key 150 comes to the opposite side of the aforesaid keyway 151. If now the collar 147 be actuated by hand, as here set forth, while the pulley 99 is revolving in the direction of the arrow in Fig. 10, it is evident that on the first engagement with the friction-rings 131 129 the shaft 85 will be revolved in the same direction as that in which said collar 147 was turned. The result of this will be to carry forward the right-hand end of the thrust-rods 154 toward their positions in Figs. 9 and 12, thus immediately releasing said friction-ring engagement. If, however, during such movement of the shaft the movement of the collar be followed up or maintained by hand, as set forth, it is obvious the engagement of the friction-rings will be maintained, notwithstanding the movement of the shaft 85. Thus the extent of movement of the shaft 85 is limited to and follows the movement of the collar 147, since any movement of said collar in advance of the shaft movement engages the clutch for turning forward the shaft, and since, vice versa, any movement of the shaft in advance of the movement of said collar disengages the clutches and retards the movement of the shaft. By this means a perfect hand control of the feed-shaft is obtained, while the movement of the shaft is effected by power.

When the sleeve and the revoluble collar 147 stand in the positions shown in Figs. 9 and 12, said collar bearing firmly against the stop-key 150, the collar 152 is, as above stated, normally fixed on the shaft 85, since this collar is splined to the shaft and rests against the thrust-rods 154, which are seated in said collar 147. Said parts therefore furnish, when in the position stated, a proper abutment against which to operate the first-described clutch-rod-actuating apparatus.

The hand-wheel shaft 184 is journaled in the outer end of a bracket 187, which is secured by a suitable bolt, as 188, to the inner side of the column C. Said bracket is preferably made vertically adjustable, so as to bring the hand-wheel 189 at a height convenient for the operator. The pinion or gear 183 is splined to the shaft 184 and is carried in a bearing 185, which is connected by a suitable arm with the bearing 178, as will be understood from Fig. 8. The collar 186, fixed to the hub of the gear 183 in a well-known manner, serves to hold said gear properly in place. The gear 183 meshes with the gear 182 on the aforesaid shaft 179, which is journaled in bearing 178. Through these connecting shafts and gearing power is transmitted from the hand-wheel to turn the aforesaid sleeve 145 in either direction, as required.

In using the machine the beam E may be moved rapidly up or down by two methods, as follows: By throwing the lever 161 toward the right hand in Fig. 2 the wedge 159 is forced between the clutch-levers 156, and, acting as hereinbefore described, frictionally but firmly engages the driving-wheel 99 with the feed-shaft 85. Next the operator seizes the hand-lever 104, and through this and the intermediate connections hereinbefore described sets the frictional gearing in engagement for moving the beam either up or down, as may be desired. By throwing said lever up the friction-wheels are thrown into the position shown in Fig. 30 and operate to revolve the feed-shaft in the direction shown by the arrow in said figure and to raise the beam E. By drawing down said lever said friction-wheels will be thrown into the position, as in Fig. 29, thereby revolving the shaft 85 in the opposite direction and lowering the beam. The other method of using the frictional feed apparatus involves the use of the hand-controlled feed mechanism, and is as follows: The feed-lever 161 being thrown toward the left hand, as in Fig. 2, the sleeve 145 is then free to be actuated, as hereinbefore set forth, by the hand-wheel 189 and the intermediate shafts and gearing. The operator now seizes the hand-lever 104, and (for instance) throwing the same up to shift the friction-wheels for running the wheel 99 in the direction of the arrow in Figs. 10 and 30, he then, by means of the hand-wheel 189, turns the sleeve 145 in the same direction, which, as hereinbefore fully set forth, operates the clutch, thus engaging said wheel 99 with the feed-shaft and causing the feed-shaft to follow the movement of the wheel 99 so fast only as said sleeve 145 is revolved by hand. This lowers the beam at a speed corresponding to the movement of the sleeve 145, which, it will be understood, may be turned at any velocity less than the maximum.

As herein shown, the hand-controlled feed apparatus is only constructed for turning the feed-shaft in one direction, this being for lowering the beam. It is not deemed necessary to provide the hand-controlled feed for the upward movement of the beam, the other feed apparatus being sufficient for raising the beam. In lowering the beam, however, it is desirable to rapidly bring the drills close down to the work, so as to save time, and hence the hand-controlled feature of the feed apparatus is arranged to operate for the lowering of the beam.

The plates or other pieces to be drilled are to be laid upon the bed A, and may be held in place by suitable bolts and clamps engaging one or more of the T-slots 250, shown formed in the upper side of said bed. When the pieces are of proper size and shape, they may of course be held in suitable chucks or work-holders placed on the bed-plate A. The pieces to be drilled having been suitably placed and the beam lowered thereto by means of the hand-controlled mechanism, as hereinbefore set forth, the operator then, by means of the lever 197, throws into action the hereinbefore-described drill-feeding mechanism intermediate to the crank-spindle 39 (having thereon the worm 194) and the feed-shaft 85. This feed mechanism, operating after the manner of drill-feeding mechanism in general, steadily feeds down the beam until thrown out of action by the operator, after which the beam may be raised by first clutching the wheel 99 to the feed-shaft, as hereinbefore set forth, and then using the reversing frictional gearing intermediate to the driving-pulley 35 and said wheel 99. During the raising of the beam the driving-pulley 35 may remain clutched to the driving-shaft 30 or may be disengaged therefrom, as occasion may require.

The hand-controlled feed mechanism comprises the details carried on the shaft 85 between the bearings 87 and 88, together with a hand-wheel and means operatively connecting the hand-wheel with said mechanism. As a matter of convenience, the shaft 85 is constructed in two parts or sections, the part 85' being solid, while the part 85 is tubular, the two parts being connected at the left hand of the bearing 88 by the shaft-coupling 125. As before mentioned, the feed-shaft 85 carries worms 167 and 168, meshing with the worm-wheels 169 and 170 for actuating the feed-screws 171 and 172, respectively. The above-described driving-pulley 99, carried on the shaft 85 outside of the bearing 87, is fitted to freely revolve on said shaft 85, being furnished with clutch mechanism for engaging and disengaging the driving-wheel from the shaft. For this purpose a friction-ring-supporting disk 135 is fixed on the shaft by a key, as 134, and engages on its outer periphery within the sliding friction-ring 131.

Having thus described my invention, I claim—

1. In a drilling-machine, the combination, with a supporting frame-work consisting of a bed-plate and vertical columns, of the beam fitted to slide on said columns and carrying a series of vertical crank-shafts, driving mechanism, substantially as described, actuating said shafts, brackets secured to the lower side of the beam, the jig-plate removably secured to said brackets and carrying drills provided with cranks, and the driving-bar carried by the crank-shaft between the beam and jig-plate and engaging the drill-cranks, substantially as described.

2. In a drilling-machine, the combination, with the beam, of two or more shafts 39, carried on said beam and having cranks on the lower ends thereof, a series of brackets, substantially as described, removably secured to the beam, the jig-plate removably secured to said brackets and carrying drills provided with cranks, the driving-boxes 47, carried on the crank-shafts between the beam and jig-plate, and the driving-bar 50, engaging the drill-cranks and removably secured to the driving-boxes, substantially as described.

3. In a drilling-machine, the combination, with the beam, of the brackets 58, set on the lower side of the beam, the key holding the bracket in alignment on the beam, bolts removably securing the brackets to the beam, the jig-plate fitted at one edge to the downwardly-projecting portion of the bracket, and means, substantially as described, removably securing the jig-plate to the bracket, substantially as shown and described.

4. In a drilling-machine, the combination, with the beam carrying the drill-actuating crank-shafts, of the main driving-shaft geared to actuate the crank-shafts, feed-screws, substantially as described, connected for raising and lowering the beam, the feed-shaft carried on the beam and geared for actuating the screws to raise and lower the beam, the intermediate shaft 190, carried on the beam and geared to actuate the feed-shaft, a wheel loosely mounted on said intermediate shaft and geared to be actuated from the main driving-shaft, and a clutch operating to engage and disengage said wheel from said intermediate shaft, substantially as described.

5. In a drilling-machine, the combination, with a supporting frame-work, of the beam vertically movable thereon and carrying drills and crank-shafts actuating the drills, driving mechanism, substantially as described, actuating said shafts, feed-screws journaled in said beam and engaging feed-nuts fixed to the top of the frame-work, a feed-shaft, substantially as described, carried on the beam and connected to simultaneously actuate said screws, reversing frictional gearing actuating said feed-shaft in either direction from the driving-shaft, and a hand-lever connected to throw said gearing into and out of action, substantially as described.

6. In a drilling-machine, the combination, with a frame-work having columns provided with vertical ways, of the beam vertically movable on said ways and carrying drill-actuating crank-shafts, the main driving-shaft geared to actuate said crank-shafts, feed-screws connecting the beam and columns to raise and lower the beam, the feed-shaft 85, carried on the beam and geared to actuate the feed-screws, a friction-wheel, substantially as described, on the main shaft, a friction-wheel, substantially as described, on the feed-shaft, intermediate wheels actuating the feed-shaft friction-wheel from the main-shaft friction-wheel, and a hand-actuated clutch for engaging and disengaging the feed-shaft friction-wheel from the feed-shaft, all substantially as described.

7. In a drilling-machine, the combination, with the drill-carrying beam and feed-screws for raising and lowering the beam, of the main driving-shaft, the feed-shaft 85, geared to actuate the feed-screws, a friction-wheel, substantially as described, on the main shaft, a friction-wheel, substantially as described, on the feed-shaft, a clutch engaging and disengaging the feed-shaft friction-wheel from the feed-shaft, hand-controlled friction-gearing operating the feed-shaft friction-wheel from the main-shaft friction-wheel, and a hand-controlled power-feed mechanism, substantially as described, connected with the feed-shaft to control said feed-shaft clutch, substantially as described.

8. In a drilling-machine, the combination, with the drill-carrying beam and feed-screws for raising and lowering the beam, of the main driving-shaft, the feed-shaft carried on the beam and geared to actuate the feed-screws, a friction-wheel, substantially as described, on the main shaft, a friction-wheel, substantially as described, on the feed-shaft, a clutch engaging the feed-shaft friction-wheel with and disengaging the same from the feed-shaft, reversing frictional gearing operating the feed-shaft friction-wheel from the main-shaft friction-wheel, and a hand-controlled power-feed mechanism, substantially as described, connected with the feed-shaft to control said feed-shaft clutch, substantially as described.

9. In a drilling-machine, the combination, with the drill-carrying beam and feed-screws for raising and lowering the beam, of the main driving-shaft, the feed-shaft carried on the beam and geared to actuate the feed-screws, a wheel loosely mounted on the feed-shaft and connected to be driven from the main shaft, a clutch engaging the feed-shaft wheel with and disengaging the same from the feed-shaft, a hand-controlled power-feed mechanism, substantially as described, connected with the feed-shaft to control said feed-shaft clutch, the shaft 179, geared to actuate said hand-controlled mechanism, and the hand-wheel shaft carried by the frame-work and connected, substantially as described, to actuate said feed mechanism through the shaft 179, substantially as described.

10. In a drilling-machine, the combination, with the drill-carrying beam and feed-screws for raising and lowering the beam, of the main driving-shaft, the feed-shaft geared to actuate the feed-screws, the friction-wheel 90 on the main shaft, the friction-wheel 99, carried on the feed-shaft for actuating the same, the shaft 98, having a crank carrying the wheel 95, adapted to engage between said main-shaft and feed-shaft wheels, and the hand-lever connected to turn said shaft 98 for engaging and disengaging the wheel 95, substantially as described.

11. In a drilling-machine, the combination, with the drill-carrying beam, of the main shaft and the feed-shaft carried on said beam, gearing, substantially as described, actuating the feed-shaft from the main shaft and comprising an intermediate wheel, a shaft, substantially as described, carrying the intermediate wheel, the toothed ring connected to actuate said intermediate wheel-carrying shaft, and a hand-lever pivotally supported, substantially as described, and having means engaging the lever with the ring in successive positions, whereby the lever may be set for operating the feed when the beam is raised or lowered, substantially as described.

12. In a drilling-machine, the combination, with a supporting frame-work, of the drill-carrying beam vertically movable from the frame-work, feed-screws connecting the beam to raise and lower the same, the feed-shaft carried on the beam and geared to actuate said screws, the main driving-shaft geared to actuate the drills, the main driving-pulley mounted to revolve freely on the driving-shaft and carrying the friction-wheel, a clutch for engaging the main driving-wheel with its shaft and disengaging the same therefrom, a friction-wheel, substantially as described, loosely mounted on the feed-shaft, reversing-gearing intermediate to said friction-wheels, and a clutch for engaging the feed-shaft wheel with and disengaging the same from the feed-shaft, whereby the beam may be operated independently of or simultaneously with the operation of the drills, substantially as described.

FRANCIS H. RICHARDS.

Witnesses:
H. MALLNER,
HENRY L. RECKARD.